No. 733,639. PATENTED JULY 14, 1903.
F. X. GARTLAND.
EYEGLASSES.
APPLICATION FILED OCT. 4, 1902.
NO MODEL.
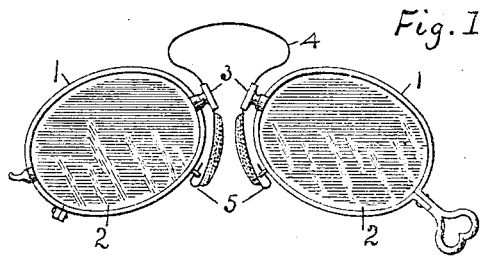
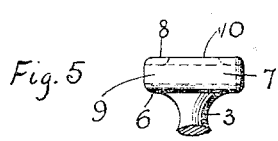
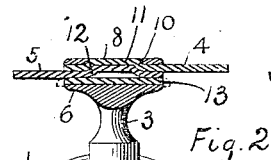
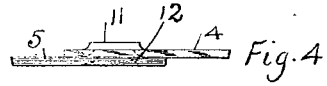
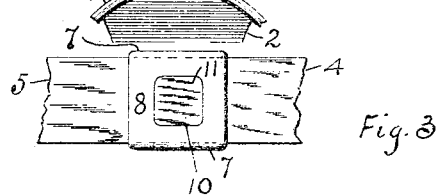
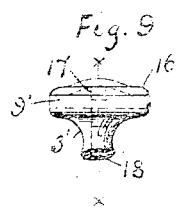
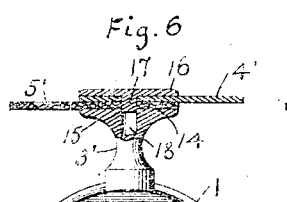
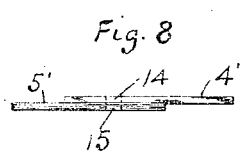
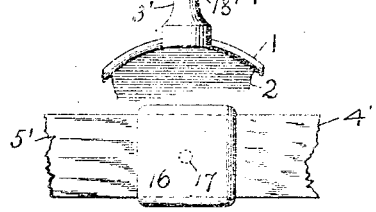
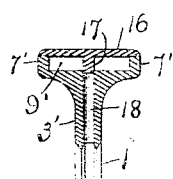
Witnesses.
Edwin Walsh.
W. H. Nightingale.
Inventor.
Francis X. Gartland
By R. E. Wright
atty.

No. 733,639. Patented July 14, 1903.

UNITED STATES PATENT OFFICE.

FRANCIS X. GARTLAND, OF PHILADELPHIA, PENNSYLVANIA.

EYEGLASSES.

SPECIFICATION forming part of Letters Patent No. 733,639, dated July 14, 1903.

Application filed October 4, 1902. Serial No. 125,863. (No model.)

*To all whom it may concern:*

Be it known that I, FRANCIS X. GARTLAND, a citizen of the United States, residing at Philadelphia, in the county of Philadelphia and State of Pennsylvania, have invented certain new and useful Improvements in Eyeglasses, of which the following is a specification.

My invention relates to eyeglasses, and more especially to their frame construction at the points where the springs and guards join the frames, and has for its object the joining of these parts without the use of screws, which are liable to work out and cause the parts to get loose and the glasses to insecurely rest on the wearer's nose.

My invention is illustrated in the accompanying drawings, in which—

Figure 1 is a view of a pair of eyeglasses such as my invention is adapted to be used with. Fig. 2 is an enlarged elevation view of my post, partly in section, to show the interlocking of the spring and guard within the post and the interlocking plate. Fig. 3 is a plan of Fig. 2. Fig. 4 is an enlarged view of the spring and a guard interlocked ready for insertion in the post. Fig. 5 is an enlarged view of the post-head before the spring and guard are inserted. Fig. 6 is an enlarged view of a modification wherein the locking-plate is dispensed with. Fig. 7 is a plan of Fig. 6. Fig. 8 is an enlarged view of the modified spring and guard ready for insertion in the post. Fig. 9 is an enlarged view of the modified post-head before the spring and guard are inserted. Fig. 10 is a section on line *x x*, Fig. 9.

Similar figures of reference indicate similar parts throughout the views.

Referring to Fig. 1, the frames 1 are of any of the usual makes to secure lenses 2, to which are secured in any usual or suitable manner the posts 3, which carry the spring 4 and guards 5.

In Figs. 2 to 5, inclusive, will be seen how I join the parts to the post 3, which has an enlarged head comprising a bottom plate 6, sides 7, and a top plate 8, forming a rectangular pocket 9. Through the top plate 8 a rectangular opening 10 is formed. Spring 4 has at each end a rectangular raised part or projection 11, adapted to closely fit into the opening 10, and each guard 5 has a raised part or projection 12, adapted to snugly fit within the projection 11 underneath it, as seen in Fig. 4. The means described locks spring 4 and guards 5 longitudinally and laterally and preserves their alinement. The spring and guards now being inserted within pocket 9 and the projection 11 placed into opening 10, as seen in Fig. 2, a space will be left under guards 5. Into this space is forced a snugly-fitting locking-plate 13, which secures all parts firmly together. As an additional security plate 13 may be made long enough to project beyond pocket 9 and have the projecting ends turned down, as shown in dotted lines in Fig. 2.

In Figs. 6 to 10, inclusive, I show a modified form of attachment of the springs and guards to the posts designed to utilize the springs and guards manufactured and in stock for screw-fastenings. Spring 4' has a hole 14 in alinement with similar holes 15 in guards 5', as seen in Fig. 8. Pockets 9' of posts 3' receive the spring and guard. The upper plate 16 of pocket 9' has on its under side a downwardly-projecting pin 17, and the plate is flexible to an extent to permit its upward bending, as seen in Fig. 9, sufficiently to permit inserting the spring and guard in the pocket under projection 17, when plate 16 will be forced down flat, as seen in Fig. 6, its projecting pin 17 entering and passing through holes 14 15 and for a very slight distance into hole 18, drilled entirely through post 3', as seen in Fig. 10. Fig. 9 is so much exaggerated to make it plain that it might seem impractical to press it to shape, as seen in Figs. 6, 10; but as in practice spring 4' and guards 5' are .016 of an inch thick (less than one sixty-fourth of an inch) and the pin 17 need only to be raised enough to admit spring 4', which then passes onto pin 17, and guard 5' then passes under it, it will be seen the bending of plate 16 is readily accomplished. When spring 4' and guards 5' are required to be removed from the pocket 9', the lens 2 is first removed, and a drift inserted through hole 18 will readily push up plate 16 and pin 17 to the position seen in Fig. 9. Plate 16 will preferably be soldered to sides 7'.

I claim—

1. In eyeglasses, frames therefor, a spring to join the frames, guards for supporting the frames having a post on each frame, a receptacle formed of connected top, bottom, and side walls, and open ends for the insertion of one end of the spring and a guard, interlocking projections on the spring and guards adapted when placed together to secure them from longitudinal and transverse separation, and means to lock them in the pockets aforesaid when locked to each other.

2. In eyeglasses, frames therefor, a post on each frame and having a pocket at its top or upper part with an aperture in the wall which surrounds the pocket, a spring having a projection at each end which is adapted to pass into the aperture aforesaid, guards having at one end a projection adapted to enter the depression under the spring's projection for interlocking, and a locking-plate adapted to enter the post-pocket under the guard.

3. In eyeglasses, frames therefor, a post on each frame having a pocket at its upper part with a rectangular opening through the top wall of the pocket, a spring having rectangular projections adapted to enter the said openings, guards having projections adapted to enter under the spring's projections and interlock therewith, and means to secure the interlocked spring and guards within the pockets aforesaid.

4. In eyeglasses, frames therefor and posts thereon having open-ended receptacles formed by bottom and side walls joined to top walls which are adapted to be downwardly pressed and carrying inwardly-projecting pins, a spring and guards having apertures adapted to receive said pins when the tops are pressed down upon the spring and guards to force the pins through the said apertures.

5. In eyeglasses, frames therefor, a spring to join the frames, guards for the frames, posts to secure the spring and guards, and having pockets in which the spring and guards are inserted, tops for the pockets and projections thereon adapted to pass through apertures in the spring and guards into passages formed within the bodies of the posts into which the projections enter for a slight distance, and through which passages means may be employed to force the projections from the holes and the apertures of the spring and guards, and whereby the guards and spring may be released.

In testimony whereof I affix my signature in presence of two witnesses.

FRANCIS X. GARTLAND.

Witnesses:
R. C. WRIGHT,
WILLIAM C. STOEVER.